(12) United States Patent
Brüning et al.

(10) Patent No.: US 10,983,043 B2
(45) Date of Patent: Apr. 20, 2021

(54) METHOD AND DEVICE FOR CATEGORIZING A FRACTURE SURFACE OF A COMPONENT

(71) Applicant: Airbus Defence and Space GmbH, Taufkirchen (DE)

(72) Inventors: Hauke Brüning, Hude (DE); Robert Meissner, Bremen (DE); André Homeyer, Bremen (DE); Thomas Körwien, Höhenkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 36 days.

(21) Appl. No.: 16/315,762

(22) PCT Filed: Jul. 7, 2017

(86) PCT No.: PCT/EP2017/067148
§ 371 (c)(1),
(2) Date: Jan. 7, 2019

(87) PCT Pub. No.: WO2018/007619
PCT Pub. Date: Jan. 11, 2018

(65) Prior Publication Data
US 2019/0242811 A1 Aug. 8, 2019

(30) Foreign Application Priority Data

Jul. 8, 2016 (DE) ..................... 10 2016 212 486.2

(51) Int. Cl.
*G06K 9/00* (2006.01)
*G01N 21/01* (2006.01)
(Continued)

(52) U.S. Cl.
CPC ............. *G01N 21/01* (2013.01); *G01N 21/00* (2013.01); *G01N 21/8803* (2013.01);
(Continued)

(58) Field of Classification Search
CPC .... G01N 21/01; G01N 21/00; G01N 21/8803; G01N 2021/8887; G06K 9/0014; G06K 9/52; G06T 7/0004; G06T 2207/20021
See application file for complete search history.

(56) References Cited

U.S. PATENT DOCUMENTS

2018/0137612 A1* 5/2018 Li ........................... G06T 7/001
2018/0247450 A1* 8/2018 Varfolomeev ....... G01N 23/046

OTHER PUBLICATIONS

Bastidas-Rodriguez et al., "Fractographic classification in metallic materials by using computer vision," Engineering Failure Analysis, vol. 59, pp. 237-252 (2016).
(Continued)

*Primary Examiner* — Dhaval V Patel
(74) *Attorney, Agent, or Firm* — Jenkins, Wilson, Taylor & Hunt, P.A.

(57) ABSTRACT

A method for categorizing a fracture surface of a component. A digital image of the fracture surface is generated. The digital image or one or more segments of the digital image is/are analyzed, wherein a category of a fracture pattern is assigned to one or more regions of the digital image or of one or more segments based on detection and statistical evaluation of spatial distribution of the smallest homogeneous image units (pixels) or image elements, and, provided that multiple regions and/or multiple segments of the digital image were analyzed, information about the regions and/or details of the digital image and categories of fracture patterns determined and assigned to them are linked to each other, and a category is assigned to the fracture surface based on this link. The method permits automatic, self-learning-categorization of fracture surfaces, for example for series tests carried out for joining technologies.

17 Claims, 3 Drawing Sheets

(51) Int. Cl.
*G06K 9/52* (2006.01)
*G06T 7/00* (2017.01)
*G01N 21/00* (2006.01)
*G01N 21/88* (2006.01)

(52) U.S. Cl.
CPC ............ *G06K 9/0014* (2013.01); *G06K 9/52* (2013.01); *G06T 7/0004* (2013.01); *G01N 2021/8887* (2013.01); *G06T 2207/20021* (2013.01)

(56) References Cited

OTHER PUBLICATIONS

Cho et al., "Process Development for Heat Sink Attachment Using Thermally Conductive Liquid Adhesives," 23rd Annual IEEE Semiconductor Thermal Measurement and Management Symposium, pp. 112-117 (2007).
Court et al., "Ageing of adhesively bonded joints—fracture and failute analysis using video imaging techniques," International Journal of Adhesion & Adhesives, vol. 21, pp. 455-463 (2001).
Kosarevych et al., "Computer analysis of characteristic elements of fractographic images," Materials Science, vol. 48, No. 4, pp. 474-481 (2013).
Lauschmann et al., "Auto-shape analysis of image textures in fractography," Image Analysis Stereology, vol. 21, pp. 139-144 (2002).
Lauschmann et al., "Textural fractography," 10 pages (2001).
Wang et al., "Statistical failure analysis of adhesive resin cement bonded dental ceramics," Engineering Fracture Mechanics, vol. 74, pp. 1838-1856 (2007).
International Search Report and Written Opinion for Application No. PCT/EP2017/067148 dated Oct. 17, 2017.

* cited by examiner

METHOD AND DEVICE FOR CATEGORIZING A FRACTURE SURFACE OF A COMPONENT

CROSS-REFERENCE TO RELATED APPLICATIONS

This application is a 371 application of PCT/EP2017/067148 filed Jul. 7, 2017 which claims the benefit of and priority to German Patent Application No. 10 2016 212 486.2 filed Jul. 8, 2016, the entire disclosures of which are incorporated by reference herein.

TECHNICAL FIELD

In the area of joining technology, there are a wide variety of known joining methods and joining means for connecting different elements of components to one another. A known example of such a joining technique is adhesive bonding. However, a series of other joining techniques are known.

BACKGROUND

For testing joined connections on components, series of tests are often systematically carried out by a plurality of test pieces being produced by joining them together, using the joining technique in each case, and the joined connections then fractured and assessed on the basis of the categorization of the fractures. For this purpose, the fracture surfaces are viewed and the type of fracture is determined from the appearance of the fracture surfaces. Until now, the fracture surfaces have been assessed personally by experts.

SUMMARY

Against the background of the prior art, the present disclosure is based on the object of being able to systematize the assessment of fractures in the area of joining surfaces and also being able to carry out a greater number of tests efficiently.

The object is achieved by a method with features disclosed herein.

Accordingly, the disclosure herein relates to a method for categorizing a fracture surface of a component in which a digital imaging of the fracture surface that assigns a value or a group of values or a vector or a matrix to each smallest resolvable image unit (pixel) of the imaging is produced, and the digital imaging or one or more segments of the digital imaging is/are analyzed, wherein image elements and their spatial distribution are ascertained, wherein one or more regions of the digital imaging or one or more segments is/are assigned a category of a fracture pattern on the basis of the spatial distribution of image elements and, if a number of regions and/or a number of segments of the digital imaging have been analyzed, the items of information concerning the regions and/or segments of the digital imaging and the ascertained categories of fracture patterns assigned to them are linked to one another and a category is assigned to the fracture surface on the basis of this linking.

The aim of the categorization of the fracture surface of the component is to determine the type of fracture which has occurred during the fracturing of the component and which depends on the quality and type of joining, in particular adhesive bonding. For example, an adhesion fracture or a cohesion fracture may occur, and still further categories of fractures are conceivable, in which for example an adhesive comes away from the surface of one of the components or a fracture takes place within a layer of adhesive. It is often even the case that different categories of fractures occur in subsurfaces of a fracture surface, so that a fracture category may also be characterized and categorized by a mixture of subfractures.

For this purpose, a digital imaging of a fracture surface, which may be a photographic imaging, is created. Such a photographic imaging may take place both in the visible range of the light spectrum and in the infrared or ultraviolet range, or it may include wavelength ranges outside the range that is visible for humans. Imaging techniques in the area of shorter or longer wavelengths of electromagnetic radiation or even corpuscular radiation may also be used.

A digital imaging may moreover also be created by mechanical or capacitive scanning of the fracture surface or by other conceivable techniques that allow the assignment of parameters to the points of the fracture surface.

As a result, the digital imaging may consist of or comprise a set of data that are assigned to the fracture surface, wherein the smallest resolvable image units (pixels) are respectively assigned values in the form of intensity, color or phase values or other scalable variables or vectors or matrices in a way corresponding to the given resolution.

The simplest application may in this case envisage producing a photographic imaging in the visible range under suitable lighting of the fracture surface with a photographically customary, highest-possible resolution and further processing it. It is in this case also conceivable to record a number of imagings of the fracture surface using different imaging methods and to overlay the results to form one digital imaging. For example, it is possible to produce different photographic imagings under different lighting or exposure conditions and to overlay them or link them to one another in order to improve the contrast of the digital imaging produced as a result.

In order to be able to recognize a structure or texture of the fracture surface once the digital imaging of the fracture surface has been produced, the recognition of image elements may take place, the spatial arrangement of which can be analyzed on this basis. For this purpose, first the smallest resolvable image units (pixels) in the given applied technique that are produced during the digital imaging may be meaningfully combined into image elements in a way corresponding to the parameters, vectors or matrices assigned to them. In this case, image elements may in principle also be provided already by the smallest image units (for example pixels) that are resolvable in the given technique. Often, however, a number of these smallest resolvable image units are combined into an image unit in the form of a spot or some other manifestation.

It may then for example be provided that the detected spatial distribution of patterns, in particular of smallest homogeneous image units or image elements, is compared with patterns that are already categorized and stored in a data processing device and a category is assigned to the recorded spatial distribution on the basis of the result of the comparison.

According to this method, first the differences from the neighboring image units are established and assessed on the basis of the given values, vectors or matrices for each given smallest image unit. Then, in an analysis of a multiplicity of values/vectors/matrices of the image, clusters of similar image units, if any are meaningfully present, are formed, wherein the corresponding pixel parameters of neighboring image units (pixels) of a cluster have smaller differences from one another than the differences from neighboring image units that do not belong to the respective cluster. In this case, the assessment of which smallest image units respectively belong to a cluster (image element) may be based on different conditions, such as for example the condition that differences in value of smallest image units (pixels) of a common cluster (image element) must not be different by more than 1%, 10%, 100% or 1000%, depending on the dynamics or the contrast of the digital imaging. The identification of an image element comprising smallest image units may also take place by a boundary line of the image element being created by comparison of values of neighboring smallest image units, wherein a boundary is drawn as soon as a certain minimum difference between values of neighboring smallest image units is reached. Many varied other possibilities of combining smallest resolvable image units of an imaging meaningfully into clusters that are referred to in the context of this application as image elements are also known in principle. As already stated, image elements may be formed on the one hand by individual units of the smallest technically resolvable image units, but also by a meaningful combination of neighboring image units with properties/assigned values, variables, vectors or matrices that are assessed as similar.

Another possibility for defining image elements is accordingly provided by different subsurfaces of the fracture surface each being respectively assigned a category by means of the detected spatial distribution of patterns or smallest homogeneous image elements.

Another possible definition of image elements may also provide that boundary lines between different categorized subsurfaces of the fracture surface are ascertained by means of the detected spatial distribution of patterns or smallest homogeneous image units and are used in the categorization.

Once the image elements have been ascertained, their spatial distribution can be determined and evaluated. The spatial distribution can be ascertained by a wide variety of known types of image processing, for example by distances or differences of the properties/assigned values, variables, vectors or matrices of respectively neighboring image elements being determined, average distances/differences being ascertained or standard deviations thereof being determined or deviations of individual distances/differences from average distances/differences being assessed. Gradients of the density of image elements or other similar parameters describing the spatial distribution, for example statistically describing the spatial distribution, may also be ascertained. This results in the ascertainment of one or more parameters of the spatial distribution that are particularly meaningful and sharply delimiting for differentiating between different categories of fracture surfaces. This allows the fracture surface to be subdivided into subsurfaces that can be delimited from one another by the parameters after the ascertainment of the spatial distribution. In this way, the fracture surface or subsurfaces of the fracture surface can be respectively assigned a category.

It may also be provided that the image elements are respectively formed by pixels (smallest resolvable image units) or groups of pixels, the intensity, color or phase values of which or other variables assigned to the pixels have recognizable differences from the values or variables of pixels or groups of pixels that do not belong to the respective image element. In this case, the focus of attention is not the ascertainment of a subsurface that has a uniform spatial distribution of the image elements, but the differentiation of neighboring subsurfaces that have different spatial distributions, in order in this way to determine a boundary line between spatial surfaces, which then as a result defines the different subsurfaces.

One particular refinement of the method according to the disclosure herein may provide that the image elements are in each case formed by pixels (smallest resolvable image units) or groups of pixels of which the intensity, color or phase values or other variables assigned to the pixels have commonalities or a defined relationship with the values of pixels or groups of pixels that likewise belong to the respective image element.

It may also be provided that the image elements are respectively formed by pixels (smallest resolvable image units) or groups of pixels of which the intensity, color or phase values differ sufficiently from values of a common background to allow a delimitation of the individual image elements from the background and from one another.

It may then be provided for example that the detected spatial distribution of image elements, in particular in the form of patterns, is compared with distributions or patterns stored and already categorized in a data processing device and a category is assigned on the basis of the result of the comparison of the detected spatial distribution.

It may in this case be provided in one form of implementation of the disclosure herein that a trainable data processing device, in particular in the form of a self-learning system and/or a trainable computer-aided method, in particular in the form of a self-learning method, is used for the assignment of a category, in particular in the form of a fracture pattern, for an assessment of the spatial distribution of image elements of the digital imaging or regions or segments of the digital imaging.

In this case, first a number of fracture surfaces or subsurfaces of fracture surfaces may be categorized by experts on the basis of prescribed digital imagings and the imagings and the categorizations performed may be entered into the system, i.e. the trainable data processing device. This then provides a self-learning system that records the categorization in connection with the digital imagings and itself creates and stores rules for the categorization. After a certain number of categorizations performed by the experts, the data processing device can itself assign categories on the basis of digital imagings.

The corresponding self-learning systems may use various methods known in information technology, such as for example neural networks and self-learning classification algorithms. These also include for example so-called Random Forest methods and Support Vector Machine methods.

Often, because the fracture surface does not have a homogeneous appearance, the category of a fracture surface can only be assessed and categorized on the basis of the assessment of subsurfaces. To this extent, it may be provided according to the disclosure herein that, by the detected spatial distribution of image elements, in particular in the form of patterns, a category is respectively assigned to different subsurfaces of the fracture surface.

It may for example also be provided that, by the detected spatial distribution of image elements and their analysis, boundary lines between different categorized subsurfaces of the fracture surface are ascertained and used in the categorization of the fracture surface.

It may in this case be provided that the image of the fracture surface is divided into a number of segments before the analysis. In this case, it may also be provided that the segments overlap one another. This may be helpful in the assessment if boundary lines between different subsurfaces to be categorized run straight along the boundaries of the segments chosen. It may, however, also be advantageously provided that the segments do not overlap one another.

It may for example also be provided that the segments do not overlap one another and are neighboring one another directly and without any distance from one another in the image.

It is in this way ensured that also every point of the fracture surfaces is assigned a point of a segment that can be evaluated.

It may be provided within the scope of the disclosure herein that at least one category of a fracture pattern is recognized by identification of a texture on a digital imaging.

A texture is in this case a manifestation of the spatial distribution of image elements. In this case, different textures may be assigned to different image segments or subsurfaces. Different subsurfaces may in this case also be differently categorized, wherein the categorization of the subsurfaces may be combined to form an overall categorization of the fracture surface (for example as a mixed fracture). The method according to the disclosure herein described above for categorizing a fracture surface of a component may be embedded in a more extensive method for testing the quality or the joining strength of an adhesively bonded joining surface. In this way, the disclosure herein can relate to a method for testing the quality or the joining strength of an adhesively bonded joining surface in which two elements of a component that are adhesively bonded together along the joining surface are first separated from one another by fracturing in the region of the joining surface, and then at least one fracture surface is categorized according to patent claim 1 or one of the following claims. The method may include the handling of the component during the fracturing and the handling of the fragments after the fracturing, wherein a digital imaging of the fracture surfaces is produced and the result of the digital imaging is analyzed further in the way described above.

One embodiment of the method of the type described above may also provide that, after the ascertainment of the image elements and their spatial distribution, at least one subsurface, in particular a number of subsurfaces, is/are ascertained, wherein each subsurface is distinguished by a uniform spatial distribution of the image elements within the subsurface and wherein, in the case of a number of subsurfaces, at least subsurfaces that are directly adjacent to one another differ from one another with respect to the spatial distribution of the image elements, and that the subsurfaces thus formed form the regions of the digital imaging or of one or more segments to which a category of a fracture pattern is respectively assigned.

The number of subsurfaces ascertained in this way can remain flexible and be based for example on the number of patterns or distributions that are differentiable in the individual case. However, the maximum number of subsurfaces that can be differentiated may also be prescribed, and the minimum differences of the patterns or distributions of different subsurfaces may be dynamically established such that the number of different subsurfaces is either determined or keeps within in a predetermined numerical range.

If a unitarily categorized subsurface is characterized by a great constriction, this subsurface may be characterized in the region of the constriction, and this subsurface may also be subdivided in the region of the constriction into two new subsurfaces.

A constriction may in this case be defined in that, in the region of the constriction, the width of the subsurface only makes up a fraction, for example a maximum of 10% or 5%, of the average width of the subsurface.

The disclosure herein relates not only to a method of the type described above but also to a device for carrying out such a method with a device for producing a digital imaging of a fracture surface, a device for ascertaining image elements, a device for ascertaining parameters that characterize the spatial distribution of image elements and also a device for comparing the parameters with reference parameters that are stored in a memory device, and also a device for assigning fracture categories from the result of the comparison if the parameters ascertained coincide with reference parameters except for predetermined permissible deviations.

Such a device may also be embedded in a more extensive device for testing the joining strength of an adhesively bonded joining surface which may moreover include a device for fracturing a component in the region of the joining surface.

BRIEF DESCRIPTION OF THE DRAWINGS

The disclosure herein is shown below in figures of a drawing on the basis of exemplary embodiments and is subsequently explained.

In the drawings.

DETAILED DESCRIPTION

Figure 1:
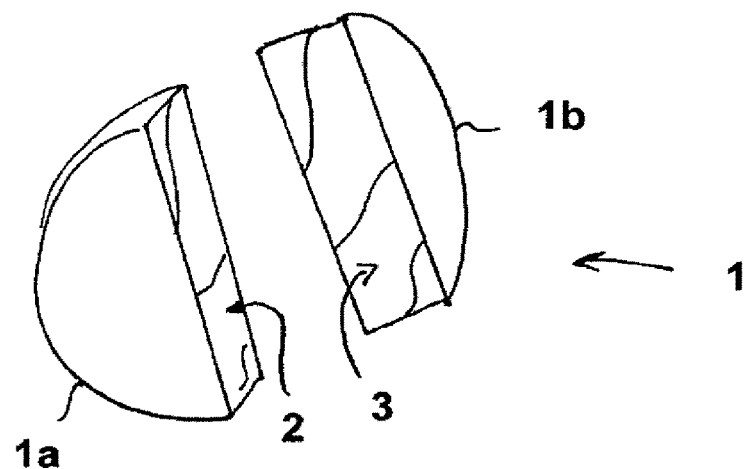
FIG. 1 shows a perspective imaging of a fractured component with two fracture surfaces.

FIG. 1 shows a perspective view of a fractured component 1, which has first been joined together from two parts 1A, 1B and then fractured along the joining surface, wherein two fracture surfaces 2, 3 are created. The fracture surfaces may be planar or curved or even polygonally ruptured.

Figure 2:
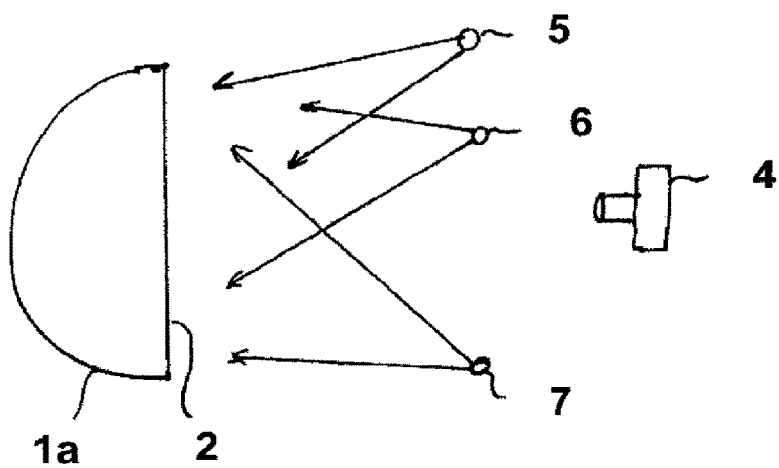
FIG. 2 schematically shows an arrangement for producing a digital image of a fracture surface.

In FIG. 2, a device for producing a digital imaging of a fracture surface 2 is schematically shown, comprising a camera 4 for recording a photographic digital image and also various lighting sources 5, 6, 7. The various lighting sources 5, 6, 7 may be optionally used, wherein the recording of an image with only a single lighting source or with the aid of ambient light is also conceivable. It is also possible for different images to be recorded, in each case with only one of the lighting sources 5, 6, 7 active. In this way it is possible to obtain images with different shadowing, which can be linked with one another and computationally combined to form a high-contrast image. The individual light sources 5, 6, 7 may for example also radiate different linear or circular polarizations of the light, so that polarized light can also be recorded by the camera 4. In this case, different polarization filters may be used, in order to isolate certain states of polarization of the light reflected by the fracture surface 2 in one or more recordings and to computationally combine the corresponding digital imagings with one another. Items of phase information of the light radiated back may also be evaluated.

Instead of visible light, an image may also be recorded in the infrared or ultraviolet range and, in an extreme case, shorter-wave radiations, types of radiation or else corpuscular radiation may be reflected at the fracture surface and be recorded by a sensor for producing a digital imaging. In these cases, the light sources 5, 6, 7 are for example replaced by corresponding radiation sources.

Figure 3:
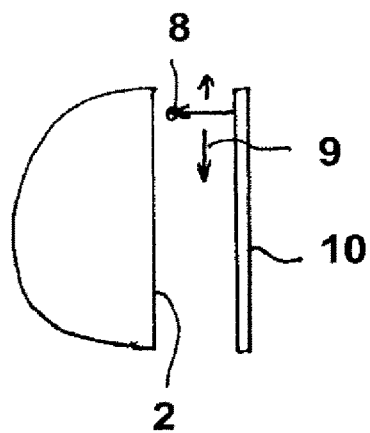
FIG. 3 shows a further arrangement for producing a digital image of a fracture surface.

FIG. 3 alternatively shows a device for producing a digital imaging of the fracture surface 2 that functions according to a scanning method, wherein a sensor 8 is moved in parallel along the fracture surface 2, as indicated by the double-headed arrow 9. For this purpose, the sensor is guided on a rail 10 or on a number of rails running perpendicularly to one another, in order to be able to scan or pass over the entire fracture surface. For example, the scanning may take place capacitively by applying an electrical voltage. The digital image may then be stored in a data processing device.

Figure 4:
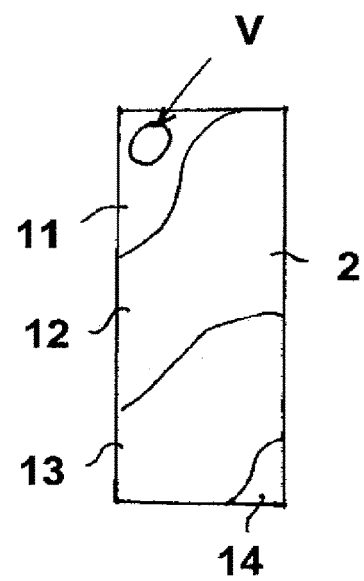
FIG. 4 shows a fracture surface in a plan view.

FIG. 4 shows by way of example an imaging of a fracture surface 2 with different subsurfaces 11, 12, 13, 14, which have different manifestations as a result of the nature of the fracture and can therefore be processed separately from one another for the evaluation. The subsurfaces can be established after the ascertainment of the spatial distribution of the image elements, in order to subdivide the image to be analyzed and first carry out an assessment or categorization of the individual subsurfaces.

It may also be provided that subsurfaces are first established on the basis of a first imaging of the fracture surface and a first analysis, and these subsurfaces are analyzed and categorized by means of a second analysis, in particular a second imaging. The first and second analyses may in this case provide different methods of analysis.

Figure 5:
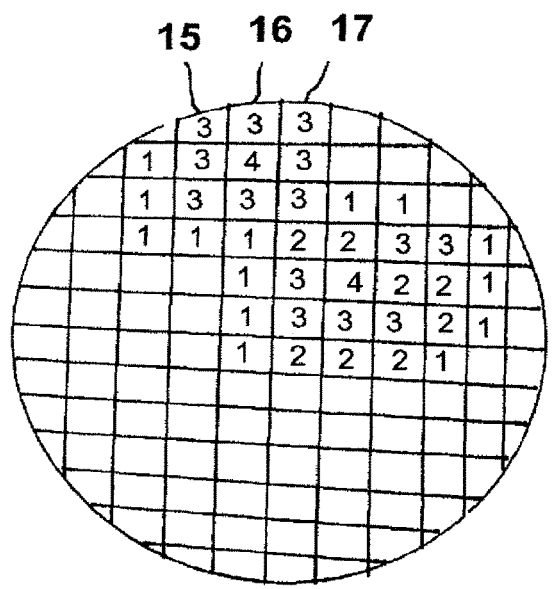
FIG. 5 shows a segment, designated in FIG. 4 by V, from a fracture surface with depicted smallest image units.

In FIG. 4, V denotes a round segment, which is shown enlarged in FIG. 5.

FIG. 5 shows in an enlarged segment a pattern of the smallest resolvable image units (pixels) 15, 16, 17 of the fracture surface. The achievable resolution in the imaging of the fracture surface depends substantially on the imaging system, for example the pixel density of the digital camera or other imaging device that is used.

Figure 6:
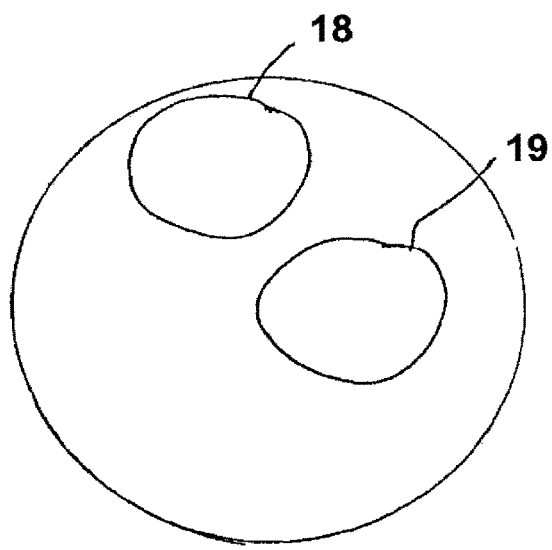
FIG. 6 shows the segment of a fracture surface from FIG. 4 with identified image elements.

As entered in FIG. 5, the individual smallest image units may for example be respectively assigned a scalar value, for example a brightness or color value. However, as explained above, the individual smallest image units may also be assigned a vector or a matrix or generally an n-tuple of scalars. This may be meaningful for example whenever, apart from a brightness value, a polarization value or a phase value is also to be detected. In the example of FIG. 5, only intensity values ranging from the value of 1 to the value of 4 have been entered in the areas of the smallest image units. It is found in the first evaluation of the imaging that two clusters/image elements can be formed from smallest image elements that are respectively grouped around an image unit with the value 4. From this image unit with the value 4, which is at the center in each case, the values decrease through 3 and 2 to 1 as the distance increases. In this way, the imaging 2 can be assigned image elements in the form of circles, which are depicted by way of example in FIG. 6. Between the two image elements 18, 19 thus identified, a distance can be defined, for example defined as the distance of the centers of the two image elements 18, 19 from one another or as the smallest distance between the edges of the two image elements 18, 19.

In this way, a multiplicity of image elements 18, 19 in the overall fracture surface can be identified and their spatial distribution analyzed. In this case, the density of the image elements 18, 19 on the surface or their average distances from one another, or average deviations from average distances, can be ascertained, or other statistical variables that represent the distribution, for example also the homogeneity or inhomogeneity of the distribution of image elements on the fracture surface.

Figure 7:
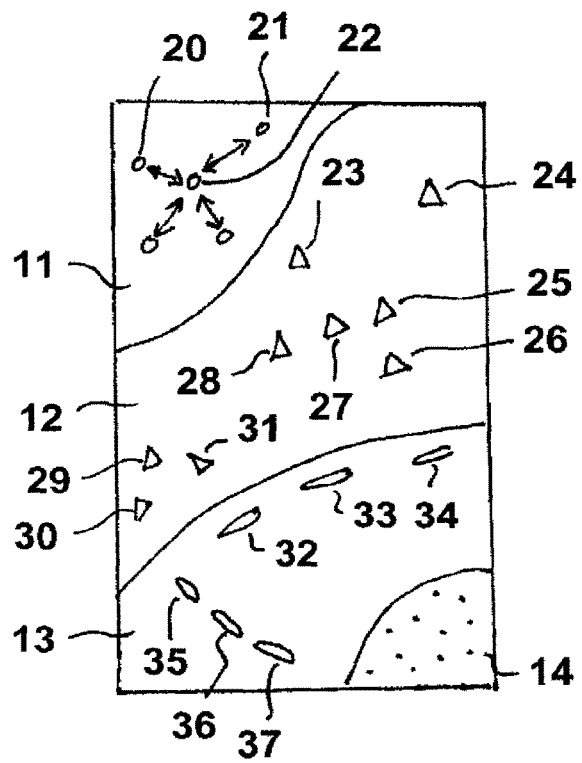
FIG. 7 shows a plan view of a fracture surface with various identified image elements.

In FIG. 7, various highly idealized distributions of image elements are shown on the subsurfaces 11, 12, 13, 14 on a fracture surface. It is typical here that different spatial distributions of the image elements occur in the region of subsurfaces on a fracture surface, so that the fracture surface displays different categories of fractures in different subsurfaces.

In the examples of FIG. 7, shown on the subsurface 11 are five circular image elements, which are distributed relatively homogeneously over the surface. The distances between the outer image elements 20, 21 and the central image element 22 and the other distances are represented by double-headed arrows, wherein the distances between closest neighboring image elements do not differ particularly greatly. The differences of these distances from one another should lie below 50% of the average distance.

Shown in the subsurface 12 are image elements 23, 24, 25, 26, 27, 28, which can be at least partially combined in the manner of clusters. The individual image elements are indicated as triangles, in order to symbolize that each individual image element has a different manifestation, as for example the image elements 20, 21, 22 on the subsurface 11. Since they are neighboring one another more closely than the other image elements on the subsurface 12, the image elements 25, 26, 27, 28 could for example be regarded as a cluster. The occurrence of such clusters may for example characterize a fracture surface of a specific category. A further cluster would then be formed for example by the image elements 29, 30, 31.

Shown on the subsurface 13 of the fracture surface are elongate-elliptical image elements 32, 33, 34, 35, 36, 37, wherein the image elements there can be clustered linearly, so that the image elements 32, 33, 34 on the one hand and the image elements 35, 36, 37 on the other hand can be combined into a chain of image elements. Such a group of image elements that can be combined can also characterize the category of a fracture surface.

Shown in the manner of points on the subsurface 14 are relatively small image elements, which are distributed very uniformly over the surface area. This too can characterize the category of a fracture surface. Other fracture surfaces may for example be characterized by similar image points, as shown on the subsurface 14, wherein the density of the image elements may differ from that of the subsurface 14, whereby a different fracture category can be formed in each case. The size of the respectively recognizable image elements or a bright/dark or gray value of a surface area may be characteristic of a fracture category.

Figure 8:
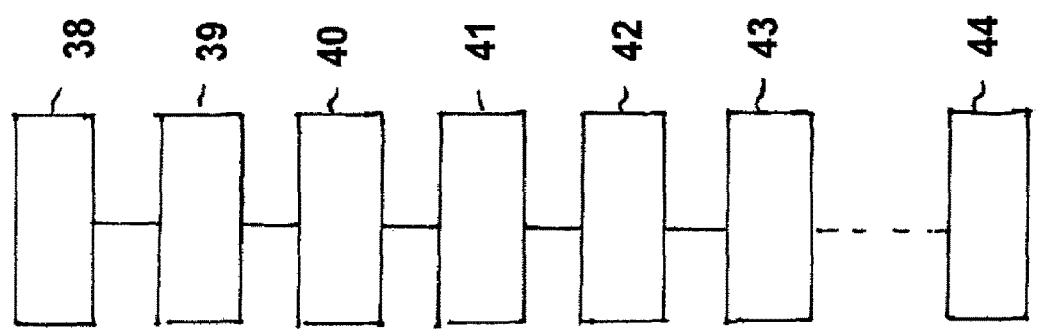
FIG. 8 shows a flow diagram of the method according to the invention.

FIG. 8 schematically shows a sequence plan in the form of a flow diagram for the method explained above. In this case, the first step 38 is that of fracturing a component along a joining surface. The second step 39 comprises the ascertainment of a digital imaging of the fracture surface, for example by photographing. The third step 40 of the method comprises the analysis of the smallest resolvable image units (pixels) and their potential combination into image elements. It should be noted in this respect that the distribution of the primary smallest resolvable image units can also already be evaluated, since they can also form the image elements directly.

Once various image elements have been formed, in the next step 41 parameters that characterize the spatial distribution of the image elements are ascertained.

In the next step 42, the parameters ascertained are compared with reference values from a database or from a data processing device. In the next step 43, the parameters ascertained are assigned on the basis of the comparison carried out to specific prescribed parameter ranges, which for their part are assigned to specific categories of fracture surfaces. The regions that are characterized by specific parameter ranges can be defined in each case as a subsurface. This provides a categorization in each case for the fracture surface or subsurfaces of the fracture surface.

Once subsurfaces of the fracture surface have been evaluated or if the categories only relate to segments or subsurfaces of the fracture surface, in a final step 44 the categorizations of the subsurfaces or segments are linked to one another and processed to form a categorization of the overall fracture surface. This may then be displayed and/or stored.

Figure 9:
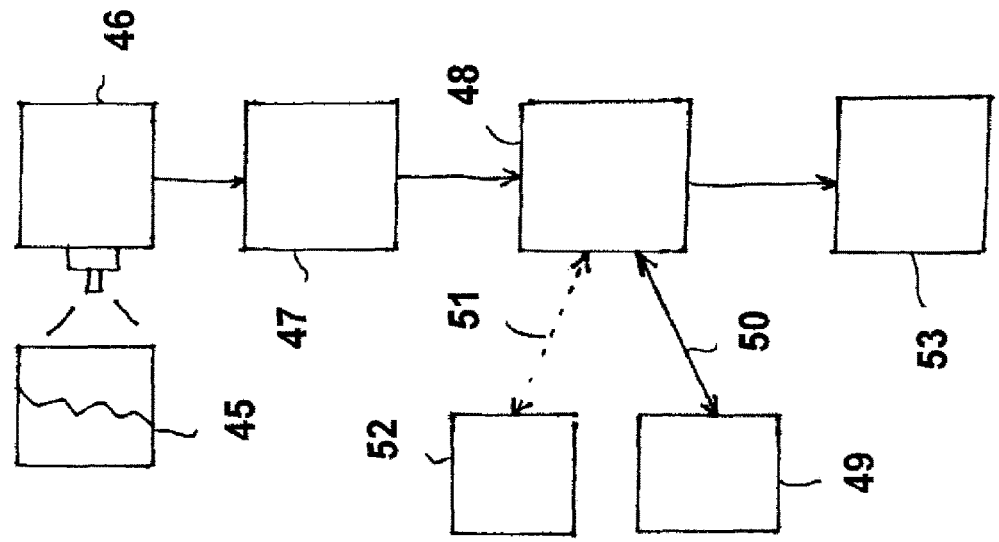
FIG. 9 schematically shows a setup of a device for carrying out the method.

FIG. 9 shows a schematic setup for carrying out the method.

In this case, the designation 45 denotes a fractured component with a fracture surface, which is imaged by a device 46 for producing a digital imaging. This may be provided for example by a digital photo camera.

The device 46 for producing an imaging sends data to a device 47, which identifies image elements in the digital imaging. The parameters of the image elements, which may be provided as values, n-tuples of scalars, vectors or matrices, are passed to a device 48 for ascertaining parameters of the spatial distribution.

The devices 47 and 48 may also be combined.

The categorization of the fracture surface on the basis of the parameterization of the spatial distribution of the image elements is carried out by a self-learning system, which may be designed for example as a so-called "Random Forest" system with classification trees, wherein a multiplicity of classification trees carry out a categorization according to the parameters of the detected digital image and a categorization of the result is carried out by individual decision trees on the basis of the statistics of the classifications. The individual decision trees may be established by the experts or be established by the training with sets of training data.

In FIG. 9, the communication of the device for ascertaining the parameters of the spatial distribution 48 with a classification database 49 is described by a double-headed arrow 50. The dashed double-headed arrow 51 symbolizes the interaction between the sets of training data stored in a training database 52 and the device 48.

The classification may for example also be carried out by other classification systems, such as for example by the Support Vector Machine method, which in its simplest form places a plane respectively between two image elements that are to be classificatorily separated in an n-dimensional space in which n-dimensional state vectors of the image elements are entered.

This method can also be made even more complex by not allowing linear separating surfaces, in that the vectors are transformed into higher dimensional spaces.

The two examples described concern functioning methods for automatically categorizing elements that are at least partially self-learning. However, these examples are not restrictive, and other known, self-learning and automatically operating systems may also be used for the categorization.

Once individual image segments or fracture subsurfaces have first been assigned a spatial distribution by the device 48, and then assigned a categorization by the comparison with reference data, the categories ascertained are passed to a processing device 53, which ascertains from the assigned categories an overall category for the fracture surface and outputs this, for example by a display, or indicates by a binary display whether or not the fracture surface in question is of a desired type.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for categorizing a fracture surface of a component, the method comprising:
producing a digital imaging of the fracture surface that assigns a value or a group of values or a vector or a matrix to each smallest resolvable image unit (pixel) of the imaging; and
analyzing the digital imaging or one or more segments of the digital imaging, wherein image elements and their spatial distribution are ascertained,
wherein one or more regions of the digital imaging or one or more segments is/are assigned a category of a fracture pattern based on the spatial distribution of image elements,
if a number of regions and/or a number of segments of the digital imaging have been analyzed, items of information concerning the regions and/or segments of the digital imaging and the ascertained categories of fracture patterns assigned to them are linked to one another and a category is assigned to the fracture surface based on this linking;
wherein, after ascertaining of the image elements and their spatial distribution, at least one subsurface, in particular a number of subsurfaces, is/are ascertained; and
wherein a maximum number of subsurfaces that can be differentiated is prescribed, and a minimum difference of patterns or distributions of different subsurfaces is dynamically established such that a number of different subsurfaces is either a predetermined number or keeps within a predetermined numerical range.

2. The method as claimed in claim 1, wherein the image elements are respectively formed by pixels (smallest resolvable image units) or groups of pixels, intensity, color or phase values of which or other variables assigned to the pixels have recognizable differences from values or variables of pixels or groups of pixels that do not belong to the respective image element.

3. The method as claimed in claim 1, wherein the image elements are in each case formed by pixels (smallest resolvable image units) or groups of pixels of which intensity, color or phase values or other variables assigned to the pixels have commonalities or a defined relationship with values of pixels or groups of pixels that likewise belong to the respective image element.

4. The method as claimed in claim 1, wherein the image elements are respectively formed by pixels (smallest resolvable image units) or groups of pixels of which intensity, color or phase values differ sufficiently from values of a common background to allow a delimitation of the individual image elements from the background and from one another.

5. The method as claimed in claim 1, wherein the detected spatial distribution of image elements, in particular in a form of patterns, is compared with distributions or patterns stored and already categorized in a data processing device and a category is assigned based on a result of the comparison of the detected spatial distribution.

6. The method as claimed in claim 1, wherein different subsurfaces of the fracture surface are each respectively assigned a category by the detected spatial distribution of image elements, in particular in a form of patterns.

7. The method as claimed in claim 1, wherein boundary lines between different categorized subsurfaces of the fracture surface are ascertained by the detected spatial distribution of image elements and their analysis and are used in the categorization of the fracture surface.

8. The method as claimed in claim 1, wherein a trainable data processing device, in particular in a form of a self-learning system and/or a trainable computer-aided method, in particular in a form of a self-learning method of classification, is used for assigning of a category, in particular in a form of a fracture pattern, for an evaluation of the spatial distribution of image elements of the digital imaging or regions or segments of the digital imaging.

9. The method as claimed in claim 1, wherein the image of the fracture surface is divided into a number of segments before the analysis.

10. The method as claimed in claim 9, wherein the segments overlap one another.

11. The method as claimed in claim 9, wherein the segments do not overlap one another.

12. The method as claimed in claim 9, wherein the segments do not overlap one another and are neighboring one another directly and without any distance from one another in the image.

13. The method as claimed in claim 1, wherein at least one category of a fracture pattern is recognized by identification of a texture on a digital imaging.

14. A method for testing quality or joining strength of an adhesively bonded joining surface in which two elements of a component that are adhesively bonded together along the joining surface are first separated from one another by fracturing in a region of the joining surface, and then at least one fracture surface is categorized according to the method of claim 1.

15. The method as claimed in claim 1, wherein each subsurface is distinguished by a uniform spatial distribution of the image elements within the subsurface and wherein, in case of a number of subsurfaces, at least subsurfaces that are directly adjacent to one another differ from one another with respect to the spatial distribution of the image elements, and wherein the subsurfaces thus formed form the regions of the digital imaging or of one or more segments to which a category of a fracture pattern is respectively assigned.

16. A device for carrying out a method as claimed in claim 1, comprising a device for producing a digital imaging of a fracture surface, a device for ascertaining image elements, a device for ascertaining parameters that characterize spatial distribution of image elements and also a device for comparing the parameters with reference parameters that are stored in a memory device, and also a device for assigning fracture categories from a result of the comparison if the parameters ascertained coincide with reference parameters except for predetermined permissible deviations.

17. A device for testing joining strength of an adhesively bonded joining surface, comprising a device for fracturing a component in a region of the joining surface and also a device as claimed in claim 16.

* * * * *